US011646870B2

(12) United States Patent
Boschini et al.

(10) Patent No.: US 11,646,870 B2
(45) Date of Patent: May 9, 2023

(54) SECURING MOBILE DEVICE BY RAM-ENCRYPTION

(71) Applicant: International Business Machines Corporation, Armonk, NY (US)

(72) Inventors: Cecilia Boschini, Zurich (CH); Jan L. Camenisch, Thalwil (CH); Tommaso Gagliardoni, Lausanne (CH); Kai Wilhelm Samelin, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 16/255,346

(22) Filed: Jan. 23, 2019

(65) Prior Publication Data

US 2020/0235919 A1    Jul. 23, 2020

(51) Int. Cl.
| | |
|---|---|
| *H04L 9/08* | (2006.01) |
| *G06F 21/60* | (2013.01) |
| *H04L 9/32* | (2006.01) |
| *H04L 9/30* | (2006.01) |
| *H04L 9/14* | (2006.01) |

(52) U.S. Cl.
CPC .......... *H04L 9/0822* (2013.01); *G06F 21/602* (2013.01); *H04L 9/0894* (2013.01); *H04L 9/14* (2013.01); *H04L 9/3073* (2013.01); *H04L 9/3226* (2013.01)

(58) Field of Classification Search
CPC ....... H04L 9/0822; H04L 9/0894; H04L 9/14; H04L 9/3073; H04L 9/3226; G06F 21/602
USPC ........................................................ 713/183
See application file for complete search history.

(56) References Cited

U.S. PATENT DOCUMENTS

| | | |
|---|---|---|
| 5,412,730 A | 5/1995 | Jones |
| 7,043,017 B2 | 5/2006 | Swindlehurst et al. |
| 7,171,557 B2 | 1/2007 | Kallahalla et al. |
| 7,184,274 B2 | 2/2007 | Wu et al. |
| 7,472,285 B2 | 12/2008 | Graunke et al. |
| 7,650,499 B2 | 1/2010 | Ittogi |
| 7,836,310 B1 | 11/2010 | Gutnik |
| 7,853,799 B1 * | 12/2010 | Trimberger ............. G06F 21/76 380/278 |
| 7,957,532 B2 | 6/2011 | Chen et al. |
| 8,345,862 B2 | 1/2013 | Bergsten et al. |
| 8,555,066 B2 | 10/2013 | Headley |

(Continued)

FOREIGN PATENT DOCUMENTS

| | | |
|---|---|---|
| WO | 2007044952 A1 | 4/2007 |
| WO | 2011100559 A1 | 8/2011 |

OTHER PUBLICATIONS

Huber, M., et al., "Protecting Suspended Devices from Memory Attacks", EuroSec '17, Apr. 23, 2017, 6 pages.

(Continued)

*Primary Examiner* — Shewaye Gelagay
*Assistant Examiner* — Moeen Khan
(74) *Attorney, Agent, or Firm* — Scully, Scott, Murphy & Presser, P.C.; Daniel P. Morris (57) ABSTRACT

A computer-implemented method for protecting a mobile device against unauthorized access may be provided. The method comprises encrypting the user data stored in a volatile memory of the mobile device if the mobile device is switched to a locked status, and decrypting the user data stored in the volatile memory if the mobile device is switched from the locked status into an unlocked status.

18 Claims, 7 Drawing Sheets

(56) References Cited

U.S. PATENT DOCUMENTS

| | | | | |
|---|---|---|---|---|
| 8,966,267 | B1* | 2/2015 | Pahl | H04L 9/3268 |
| | | | | 713/171 |
| 9,634,999 | B1 | 4/2017 | Marion et al. | |
| 9,703,891 | B2 | 7/2017 | Tao | |
| 9,847,877 | B2 | 12/2017 | Camenisch et al. | |
| 2003/0084308 | A1 | 5/2003 | Van Rijnswou | |
| 2003/0174840 | A1* | 9/2003 | Bogan | H04L 9/0894 |
| | | | | 380/277 |
| 2006/0005047 | A1 | 1/2006 | Lekatsas et al. | |
| 2006/0053306 | A1* | 3/2006 | Adams | G06F 21/57 |
| | | | | 713/190 |
| 2006/0078108 | A1 | 4/2006 | Batcher | |
| 2008/0080715 | A1* | 4/2008 | Lee | G06F 21/85 |
| | | | | 380/277 |
| 2011/0185186 | A1* | 7/2011 | Adams | H04W 12/02 |
| | | | | 713/189 |
| 2012/0042157 | A1* | 2/2012 | Leclercq | G06F 21/72 |
| | | | | 713/2 |
| 2014/0006806 | A1 | 1/2014 | Corella et al. | |
| 2014/0059671 | A1 | 2/2014 | Celi, Jr. et al. | |
| 2015/0006881 | A1 | 1/2015 | Perlmutter et al. | |
| 2016/0065366 | A1 | 3/2016 | Camenisch et al. | |
| 2017/0230179 | A1 | 8/2017 | Mannan et al. | |
| 2017/0250972 | A1* | 8/2017 | Ronda | H04L 9/0891 |
| 2018/0248693 | A1* | 8/2018 | Bowman | H04L 9/0819 |
| 2018/0365453 | A1* | 12/2018 | Hartway | G06F 21/31 |
| 2019/0005229 | A1* | 1/2019 | Hlaing | G06F 9/445 |
| 2019/0182042 | A1* | 6/2019 | Ebrahimi | H04L 9/3231 |

OTHER PUBLICATIONS

Dargin, M., "Encryption critical for protecting mobile device data", Network World, Apr. 3, 2017, 4 pages.

Prajyot, P.P., et al., "Secure Storage of Data on Android Based Devices", IACSIT International Journal of Engineering and Technology, Jun. 2016, p. 177-182, vol. 8, No. 3.

Baldimtsi, F., et al., "Recovering Lost Device-Bound Credentials", In Applied Cryptography and Network Security—13th International Conference, ACNS 2015, Jun. 2-5, 2015, pp. 307-327.

Ege, B., et al., "Memory Encryption for Smart Cards", In Smart Card Research and Advanced Applications—10th IFIP WG 8.8/11.2 International Conference, CARDIS 2011, Sep. 14-16, 2011, Revised Selected Papers, pp. 199-216.

Gotzfried, J., et al., "Hypercrypt: Hypervisor-based Encryption of Kernel and User Space", In 11th International Conference on Availability, Reliability and Security, ARES 2016, Aug. 31-Sep. 2, 2016, pp. 9 pages.

Huber, M., et al. ,"Freeze & Crypt: Linux Kernel Support for Main Memory Encryption", In Proceedings of the 14th International Joint Conference on e-Business and Telecommunications (ICETE 2017), Jul. 24-26, 2017, pp. 17-30, vol. 4: SECRYPT.

Henson, M., et al., "Memory Encryption: A Survey of Existing Techniques", ACM Computing Surveys, Mar. 2014, 32 pages.

Muller, T., et al., "TRESOR Runs Encryption Securely Outside RAM", Proceedings of the 20th USENIX Security Symposium 2011, Aug. 8-12, 2011, 16 pages.

Muller, T., et al., "TreVisor OS-Independent Software-Based Full Disk Encryption Secure Against Main Memory Attacks", In Applied Cryptography and Network Security—10th International Conference, ACNS 2012, Jun. 26-29, 2012, pp. 66-83.

Tang, Y., et al., "CleanOS: Limiting Mobile Data Exposure with Idle Eviction", 10th USENIX Symposium on Operating Systems Design and Implementation (OSDI' 12), Oct. 8-10, 2012, pp. 77-91.

Wurstlein, A., et al., "Exzess: Hardware-based RAM Encryption Against Physical Memory Disclosure", Architecture of Computing Systems (ARCS 2016) 29th International Conference, Apr. 4-7, 2016, pp. 60-71.

Yan, C., et al., "Improving Cost, Performance, and Security of Memory Encryption and Authentication", Proceedings of the 33rd International Symposium on Computer Architecture (ISCA '06), Jun. 17-21, 2006, 12 pages.

Aiko Solutions, "SecuBox for Windows CE", https://aikosolutions.com/products/secubox-for-windows-ce/, Accessed on Jan. 23, 2019, 1 pages.

* cited by examiner

SECURING MOBILE DEVICE BY RAM-ENCRYPTION

BACKGROUND

The present disclosure relates generally to a method for protecting a mobile device, and more specifically, to a computer-implemented method for protecting a mobile device against unauthorized access. The present disclosure relates further to a related system for protecting a mobile device against unauthorized access, and a computer program product.

Nowadays, devices, such as smart phones, tablet computers and notebook computers of any size are widely used. They are used in a huge variety of different activities such as leisure activities, communication, but also to process potentially high-value information, e.g., images, various personal data (such as address, bank account data, other authorization data), and, if used in a professional environment, company confidential information.

However, such a device can easily be lost, be forgotten (e.g., in the office), or be stolen. This may put the data stored in the device and at a severe risk of unauthorized access. This does not only affect data in the long-term storage, but, not less, and sometimes even more important, data stored in the RAM (random access memory), e.g., VPN (virtual private network) key-material, and open email client, an open document or, a single-sign-on token, still residing in the browser's memory. Because of the growing battery capacity, users often do not switch off the devices and thus, making the data in the RAM vulnerable.

A disadvantage of known solutions may be that either the access to the device may be protected or simply the data in the long-term storage. However, data in volatile memory of the mobile device, which is required to be available in clear text form for processing, is not protected at all.

However, there may be a need to overcome a limitation of existing technology, for example, also protecting data in volatile memory, e.g., in the RAM, of a mobile device against unauthorized access.

SUMMARY

According to one aspect of the present invention, a computer-implemented method for protecting a mobile device against unauthorized access may be provided. The method may comprise encrypting the user data stored in a volatile memory of the mobile device if the mobile device is switched to a locked status, and decrypting the user data stored in the volatile memory if the mobile device is switched from the locked status into an unlocked status.

According to another aspect of the present invention, a system for protecting a mobile device against unauthorized access may be provided. The system may comprise an encryption unit adapted for encrypting the user data stored in a volatile memory of the mobile device if the mobile device is switched to a locked status, and a decryption unit adapted for decrypting the user data stored in the volatile memory if the mobile device is switched from the locked status into an unlocked status.

The proposed computer-implemented method for protecting a mobile device against unauthorized access may offer multiple advantages and technical effects:

Data stored in the volatile memory, e.g., dynamic data in the RAM, of a mobile device may be protected against unauthorized access. The protection may be performed by an encryption of the content of the RAM, in particular, the part of the RAM being used for user data, in case the mobile device is switched, in particular, automatically, from an unprotected status to a protected status. The protected status is typically characterized by a screen needing a short PIN (personal identification number input), or the like, in order to allow a full access to the touch screen again, and thus, the full functionality of the mobile device.

In one aspect, with a method in the present disclosure in an embodiment, brute force attacks to any part of the storage of the mobile device will not lead to an accessibility of the data stored in the volatile memory, e.g., the RAM, of the mobile device because, in one embodiment, the decryption key is not available and/or in the mobile device. However, at least a portion required of the decryption key may be stored remotely on a server. The handling of the encryption and decryption may be completely transparent for the user. He may use his mobile device as before. The encryption and decryption may be performed automatically when switching the mobile device from a locked to an unlocked status, and vice versa.

Additionally, in another embodiment, it may also be possible to store a decryption key in the mobile device, however, only in the form of a high-entropy secret. Such a high-entropy secret may be used as a fallback solution if a wireless connection to the server storing a portion of the decryption key (or the complete decryption key) may not be available. On the other side, the high-entropy secret may be completely unpractical for a daily usage. Thus, the proposed concept reflects both: high usability, as well as, optimal protection against unauthorized access of data in the volatile memory, i.e., the RAM, of the mobile device. Additionally, the proposed concept may not only be applicable for mobile phones, i.e., smart phones, but also other mobile devices like electronic keys, cameras, extended PDAs (personal digital assistant), payment devices, and the like.

In the following, additional embodiments of the inventive concept will be described.

According to one embodiment, the method may also comprise switching the mobile device into the locked status after a power-on of the mobile device, or after a time period of inactivity (of a user using the device), or after receiving a lock signal. The locked signal may be based on a user action, i.e., a user input via a touch screen, or any other input mechanism (e.g., voice, fingerprint, image via the camera, e.g., iris scan, or similar). Another alternative for switching the mobile device into the locked state may be implemented by putting the mobile device in a specific position, e.g., screen down on a table, or by connecting a charge cable or placing the mobile device on a wireless charge station.

According to one advantageous embodiment, the method may also comprise using a fresh encryption key every time the encrypting of the user data stored in the volatile memory may be performed. This way, it may be avoided to store a permanent encryption key in the mobile device which may be compromised. By using each time for the encryption a newly generated fresh encryption key, the risk factor of stealing the key may be reduced to almost Zero.

According to another advantageous embodiment, the method may also comprise protecting the fresh encryption key by encrypting the fresh encryption key with a static encryption key. The static encryption key may be a public key of a public/private key pair. In case no public/private key pair encryption is possible, it may be possible—in one embodiment—to protect the "standard encryption key" by a separate alternative encryption. Hence, the decryption key may never be accessible in clear text. It may also be noted that the static encryption key may be a high-entropy expression, like, e.g., a long sentence instead of a short number-based PIN (e.g., up to 6 characters).

According to a further advantageous embodiment, the method may also comprise protecting the fresh encryption key by encoding the fresh encryption key into two parts, namely a local recovery key, stored in the non-volatile memory of the mobile device—which may in particular, include the device's permanent local secret and a temporary blinding value—and a remote recovery key—which, in particular, may comprise a nonce and another share of the key stored by one or more servers, each encrypted by the server's public key—sent to a remote server.

According to one additional embodiment, the method may also comprise encrypting the private part of the public/private key pair using a high-entropy key, e.g., a 256 bit symmetric key, using, e.g., AES or similar, derived by a high-entropy user input—in particular, a very, very long pin or other expression, biometrically input data (e.g., fingerprint, iris scan), etc. This may only be used if no network connection may be available for providing the remote portion of the key. Furthermore, this embodiment may also comprise storing the resulting encrypted private part of the public/private key pair in the non-volatile memory of the mobile device, i.e., the long term storage of the mobile device.

According to one possible embodiment of the method, the switching the mobile device from a locked status into the unlocked status may comprise receiving a personal identification number—e.g., via a low—entry user input, like a short PIN, and using the personal identification number for performing an authentication protocol with the remote server. This way, both portions of the decryption key may be recombined for allowing a one-time decryption. It may be noted that such a decryption key may not be used a second time for encrypting or decrypting, because during the next encryption of the RAM content a freshly generated encryption key may be used.

According to one additional embodiment of the method, a successful execution of an authentication protocol with a remote server may comprise receiving the remote recovery key from the server, and using the remote recovery key and the local recovery key to recover the fresh encryption key. This may close the loop of sending the portion of the encryption key to a server and receiving it back for a combination as decryption key.

According to one allowable embodiment of the method, a failure on an authentication protocol with a remote server may comprise prompting—e.g., the user—for inserting the high-entropy user input, using the high-entropy user input to recover the high-entropy key, using the high-entropy key to decrypt the private part of the public/private key pair, and using the private part of the public/private key pair to decrypt the fresh encryption key which was encrypted using the static encryption key. Thus, also in the case of an unavailability of a wireless connection to a server, the mobile device can still be unlocked. I.e., the user knowing the required high-entropy input to recover the high-entropy key can still access the user data in the RAM. However, for unauthorized parties trying to break into the user data it becomes almost impossible to "hack" the data.

According to one optional embodiment of the method, the mobile device may comprise a display, wherein the switching the mobile device into a locked status may comprise blocking keypad inputs—in particular, touch-screen keys or real keys—apart from accepting a personal identification number or, if no network connection is available, accepting a high-entropy value, which may be the public key of the public/private key pair. Hence, the mobile device continues to be accessible with or without a more wireless connection (long-range mobile connection, Wi-Fi, Bluetooth, and others).

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'mobile device' may denote, a mobile computing system typically comprising an input device, like a keyboard or a touch sensitive screen. The keyboard may be limited for entering only numbers. However, also a complete keyboard may be appropriate. The mobile device may be a smart phone, a feature phone, a mobile key, a mobile payment system, or any other mobile device implemented together with a wireless communication function. Additionally, the mobile device may also comprise the main memory in form of a RAM/volatile memory (static RAM, dynamic RAM) and a long-term storage, i.e., a non-volatile memory (e.g., in form of an SSD solid state disk).

The term 'unauthorized access' may denote that a user, who is not allowed to access data on a mobile device may have no access to data and/or applications on the mobile device. The unauthorized user may have stolen the mobile device, or just found it because it was lost. In any case, the unauthorized user may not know the secret PIN or any other password for accessing the device. For him, it may be required to break the protection of the mobile device.

The term 'user data' may denote data and/or applications and/or application data in a RAM of a mobile device. The data being used by the operating system may not be denoted as user data. They may be stored in a separate portion of the RAM not being encrypted by the proposed method.

The term 'encrypting' may denote protecting data against unauthorized access. A key or another sort of secret may be used to transform the clear text data into a meaningless form for the user.

The term 'volatile memory' may denote a memory as part of a mobile device losing its status if no power is supplied to the memory. This is typically the case for a RAM/main memory of a mobile device, e.g., being implemented using dynamic RAM memory cells.

The term 'locked status' may denote that the keypad of the mobile device may not accept any input apart from a secret PIN or secret password. Furthermore, the locked status may typically also block execution of user programs of the mobile device (exceptions may exist). In contrast, in the unlocked status, the mobile device may allow to access any of the applications available to the user (in addition to operating system functions).

The term 'decrypting' may denote the contrast to an encrypting function. Thus, data in a meaningless form may be transformed back into clear text format to be accessed again by applications in the usual way.

The term 'fresh encryption key' may denote a key (bit sequence) to be used for an encryption of user data. One may also say that a temporary or one-time encryption key is used. Each time an encryption process is performed, a newly generated—randomly generated—key is used.

The term 'static encryption key' may—in contrast to a fresh encryption key—denote a key or secret not changing over time, unless a user or administrator of a mobile device makes a change to the static encryption key.

The term 'public/private key pair' may denote an asymmetric key pair for encrypting data. The public portion of the key pair may be disseminated widely, while the private portion of the key pair is typically only known to a single user or a single system. This may accomplish two functions: authentication, wherein the public key verifies that a holder of the paired private key sent the message; and encryption, wherein only the paired private key holder can decrypt the message encrypted with a public key.

The term 'encoding' may denote here, that an encryption key—in particular the freshly generated encryption key—may be separated into two or more portions. The split of the encryption key into its portions may be performed by any suitable algorithm. The split may be done into halves (e.g., in case of one remote server), or any suitable number of portions split proportionally or un-proportionally to the number of constituents (mobile device and servers).

The term 'local recovery key' may denote a recovery key that may be stored in the mobile device and being accessible without any external system. The local recovery key may protect itself.

The term 'remote recovery key' may denote that the recovery key is not stored in the local mobile device, but may require a wireless connection to a (one or more) remote server (s). Only the combination of the local recovery key and the remote recovery key may together form a complete recovery key to decrypt and reassess the encrypted user data.

The term 'remote server' may denote any computing system being accessible by a wireless connection adapted for storing data, in particular encryption keys, being able to respond to challenges and being able to compute security functions.

The term 'high-entropy key' may denote a long password, e.g., comprising more than 10 characters, but typically many more, like an easy to remember sentence comprising words of characters. In contrast to this, a low-entropy key may be a PIN (personal identification number), e.g., a four digit or four letter key expression. Any other length than four characters are possible. However, it should be convenient for a user to input them into the mobile device in order to set the mobile device into the unlocked status.

The term 'non-volatile memory' may denote a long-term storage of a mobile device, wherein the non-volatile memory or storage continues to store the data after a power-down.

The term 'authentication protocol' may denote a defined sequence of data exchanges enabling an authorization of a user (or system) to perform a certain task, e.g., access an application or data or a secret key.

The term 'success' (in particular, of a protocol) may denote here that a challenge may receive a positive response. In contrast, the term 'failure' may denote that a challenge may not receive a positive response.

Additionally, it may be noted that Shamir's Secret Sharing may describe an algorithm in cryptography created by Adi Shamir. It is a form of secret sharing, wherein a secret is divided into parts, giving each participant its own unique part, where some of the parts or all of them are needed in order to reconstruct the secret. Counting on all participants to combine the secret might be impractical, and therefore sometimes the threshold scheme is used wherein any of the parts are sufficient to reconstruct the original secret.

Before describing the figures in detail, the theoretical background of the proposed protection method for volatile data in the RAM of a mobile device shall be described:

Firstly, a first embodiment without backup shall be described. In a nutshell, the user has a portable device with an operating system in kernel mode (in principle, this can even be a hypervisor) and some applications in "user-land". The concept is that once the kernel notices that the device is no longer in use (e.g., "screen turns dark", or after some user-defined timeout, no movement detected, manually set to have a lock status, etc.), it freezes the applications in user-land, encrypts them under a fresh encryption key, and shares this encryption key—e.g., or a part—with a remote server wirelessly. The server, however, only sends back its part of the encryption key k if the entered partial value by the user was correct. However, firstly some preliminaries may be defined.

The main security parameter is denoted by $\lambda \in \mathbb{N}$. All algorithms implicitly take $1^\lambda$ as an additional input. One can write $a \leftarrow A(x)$ if a is assigned to the output of the deterministic algorithm A with input x. If an algorithm A is probabilistic, one writes $a \leftarrow\$ A(x)$. An algorithm is efficient if it runs in probabilistic polynomial time (PPT) in the length of its input. For the remainder of this document, all algorithms are PPT if not explicitly mentioned otherwise. Most algorithms may return a special error symbol $\perp \notin \{0, 1\}^*$, denoting an exception. If S is a set, we write $a \leftarrow \$ S$ to denote that a is chosen uniformly at random from S. A function v: $N \rightarrow R_{\geq 0}$ is negligible if it vanishes faster than every inverse polynomial, i.e., $\forall k \in N, \exists n_0 \in N$ (natural numbers) such that $v(n) \leq n^{-k}, \forall n > n_0$.

Pseudo-random generators (PRG) allow to generate a long string x of bits from a short secret seed s; such a string is computationally indistinguishable from a purely random string. One can write this as $x \leftarrow PRG(s)$.

PRGs allow generating randomness from a short seed which is indistinguishable from a purely random string. For the purpose here, a constant stretching factor of 2 is assumed to form a GGM-Tree (Goldreich-Goldwasser-Micali). A pseudo-random generator PRG has one algorithm {eval} such that the deterministic algorithm eval gets as input a point $p' \in \{0, 1\}^\kappa$ to evaluate.

It outputs a new point $p'_0 \in \{0, 1\}^{2\kappa}$:$p'_0 \leftarrow eval(p')$, $p' \in \{0, 1\}^\kappa$.

Next, collision-resistant hash-functions are described. A family $\{H^k_R\}$, $k \in K$ of hash-functions $H^k$: $\{0, 1\}^* \rightarrow R$ indexed by key $k \in K$ is collision-resistant if for any adversary A, if there exists a negligible function v such that:

$$Pr[H^k_R(v) = H^k_R(v') \wedge v \neq v' : k \leftarrow \$ K, (v, v') \leftarrow \$ A(k)] \leq v(\kappa)$$

Now, a description of the first used protocol follows:

It is assumed that the following protocol runs in kernel mode, while the kernel needs to know which RAM parts it can encrypt (those that it does not need, i.e., "user-land"). This is controllable in the page-table. It is further assumed that the communication to and from the servers is encrypted, e.g., using a standard PKI (public/private key infrastructure) and each message is pre-fixed with a user ID to make each step linkable to a specific user.

The setup phase comprises the following steps:
Choose a salt $s \leftarrow \$ \{0, 1\}^\kappa$.
Choose at least one server $S_i$.
Send, to all servers, $h = H(s, S_i, pw)$, where pw is the secret string, e.g., a password.
Store the salt s and all identities $S_i$ with corresponding public key $pk_i$
Delete pw on the mobile device.

After setup, the user can start and use programs all the time. If, however, the kernel decides to encrypt the RAM, it performs the following steps.
Freeze all user-programs.
Draw a key $k \leftarrow \$ \{0, 1\}^\kappa$.
Let $(k_{1,1}, k_{2,1}) \leftarrow PRG(k)$.
Encrypt the RAM-content: $RAM[1] \leftarrow RAM[1] \oplus k_{1,1}$, where RAM[1] is the block of appropriate size, e.g., $\kappa$, where the user data (and not kernel memory) is located. If the block-size is smaller, cut off bits from $k_{1,1}$; if it is larger, apply PRG till the bit-size is greater.
Repeat the following pattern: $(k_{1,i}, k_{2,i}) \leftarrow PRG(k_{2,i-1})$ and set $RAM[i] \leftarrow RAM[i] \oplus k_{1,i}$.
Generate a secret-share $s_i$ for each server and the mobile device ($s_k$), e.g., using Shamir's secret sharing of k (see definition above).
Send $s_i$ to server $S_i$.
Each server $S_i$ stores $s_i$.
Delete each $s_i$, but $s_k$ on the mobile device.
Delete k on the mobile device.

Next, the decrypting (CTR mode) will be described: A more advanced memory encryption method is based on the CTR block cipher mode of operation. This allows for selective decryption of memory blocks, and a prioritization of the decryption of those areas of the RAM which are more involved in the tasks usually associated to the unlocking of the device (e.g., GUI drawing, recently opened apps, etc.), thereby making the unlocking procedure more reactive to the user.

For this encryption mode, it is assumed that every RAM element is uniquely identified by an l-bit integer (i.e. memory address). For portable devices, such as smartphones, this is usually a 32 or 64 bit address. One then makes use of a pseudorandom function (PRF), mapping an l-bit element x to a $\kappa$-bit element y through a secret key k of bit-length $\kappa$. One writes this as $PRFk(x) = y$. For practical purposes, one can obtain such PRF as $PRFk(x) \leftarrow PRG(x \| k)$ (in this case one does not even need a stretching factor of 2 for the PRG, it is sufficient to have a $\kappa$-bit output):
Freeze all user-programs.
Draw a key $k \leftarrow \$ \{0, 1\}^\kappa$.
Repeat the following pattern: $k_i \leftarrow PRFk(i)$ and set $RAM[i] \leftarrow RAM[i] \oplus k_i$ where RAM[i] is the memory block of appropriate size, e.g., $\kappa$, at memory address i, where user data (and not kernel memory) is located.
Generate a secret-share $s_i$ for each server and the mobile device ($s_k$), e.g., using Shamir's secret sharing of k.
Send $s_i$ to server $S_i$.
Each server $S_i$ stores $s_i$.
Delete each $s_i$, but $s_k$ on the mobile device.
Delete k on the mobile device.

It may also be noted that the encryption procedure can always be aborted, as long as it is not finished, and only requires a constant (and negligible) amount of RAM which needs to reside in kernel space.

A subsequent decrypting could be there for in the following way:
Enter pw'.
Send $h' = H(s, S_i, pw)$ to each server.
If $h = h'$, a server sends back $s_i$. (Here, the server can throttle after too many failed attempts!)
Once every $s_i$ is received, combine every $s_i$ and $s_k$ to form k.
Decrypt the RAM: $RAM[1] \leftarrow RAM[1] \oplus k_{1,1}$, where RAM[1] is the block of appropriate size where user data is located. If the block-size is smaller, cut of bits from $k_{1,1}$, if it is larger, apply PRG till the bit-size is greater.
Repeat the following pattern: $(k_{1,i}, k_{2,i}) \leftarrow PRG(k_{2,i-1})$ and set $RAM[i] \leftarrow RAM[i] \oplus k_{1,i}$.

A decryption in CTR mode can be performed as follows:
Enter pw' into the mobile device, e.g., by a user.
Send $h' = H(s, S_i, pw')$ to each server $S_i$.
If $h = h'$, a server sends back $s_i$. (Here, the server can throttle after too many failed attempts!)
Once every $s_i$ is received, combine every $s_i$ and $s_k$ to form k.
Decrypt the RAM: $RAM[i] \leftarrow RAM[i] \oplus k_i$, where $k_i \leftarrow PRFk(i)$, and RAM[i] is the memory block at address i where the user data is located. Repeat this for every user data memory block, in whatever order it is more suitable for the desired setup. By default, this is done sequentially starting from the lowest-value block address.

Generalized Access-Structures

In the above protocol, each server needs to return its share $s_i$ to make the decryption possible. However, this may not always be possible. To achieve a version with generalized access-structures, Shamir's secret sharing scheme may be replaced with a generalized version which allows for such structures.

How to Make the Servers Play Correctly

In the currently proposed formalization, the servers may send any $s_i$ to the mobile device, which, depending on the secret-sharing scheme used, may result in a random "decryption", as the seed is different. This may be mitigated by also generating a MAC key m and "MACing" all $s_i$ sent to the servers (with a scheme which does not leak the message it protects!). Once each $s_i$ is received, the kernel may check whether the MAC is correct using m and otherwise reject the share $s_i$. This is in particular useful if generalized access structures are used, i.e., not all shares are necessary to reconstruct k, as even in the case of a wrong reply, not all keys are needed.

Adding Key Backups

As an additional feature, key-backups may be considered. Assumed, e.g., that some servers went offline or simply crashed. In this case, there may be the problem that the data cannot be re-constructed. To avoid this, the key k can also be encrypted with a public key pk of a standard IND-CCA2 secure encryption scheme. The corresponding secret key sk then needs to be stored in a secure location by the user, e.g., on the company's server, to which a user gains access using secure means, e.g., by authenticating personally.

Adding Data Backups

The above idea is extendable by also backing up the encrypted data in the case that, e.g., the device is lost. However, in this case it is enough to back-up the encrypted data, e.g., into the cloud.

Encrypting Only Parts

In the above description, the complete user-space memory is encrypted. Clearly, one may also define which user-programs are to be encrypted to increase encryption and decryption speed, e.g., a game, i.e., game data can remain unencrypted.

Network Disconnectivity

To avoid the problem that the network must be reachable, one can also encrypt k using a cryptographically strong password (with enough entropy to avoid offline attacks) and store the ciphertext on the device. Thus, either the short password is enough, or in case of major network disconnection, the long password (compare above: high-entropy key) can be entered to make the device useable again.

Hard-Disk Encryption

The above method assumes that a program is not swapped onto the hard-disk. If this is the case, the disk needs to be encrypted as well. However, for this known technology may be used.

In the following, a detailed description of the figures will be given. All instructions in the figures are schematic. Firstly, a block diagram of an embodiment of the inventive computer-implemented method for protecting a mobile device against unauthorized access is given. Afterwards, further embodiments, as well as embodiments of the system for protecting a mobile device against unauthorized access, will be described.

Figure 1:
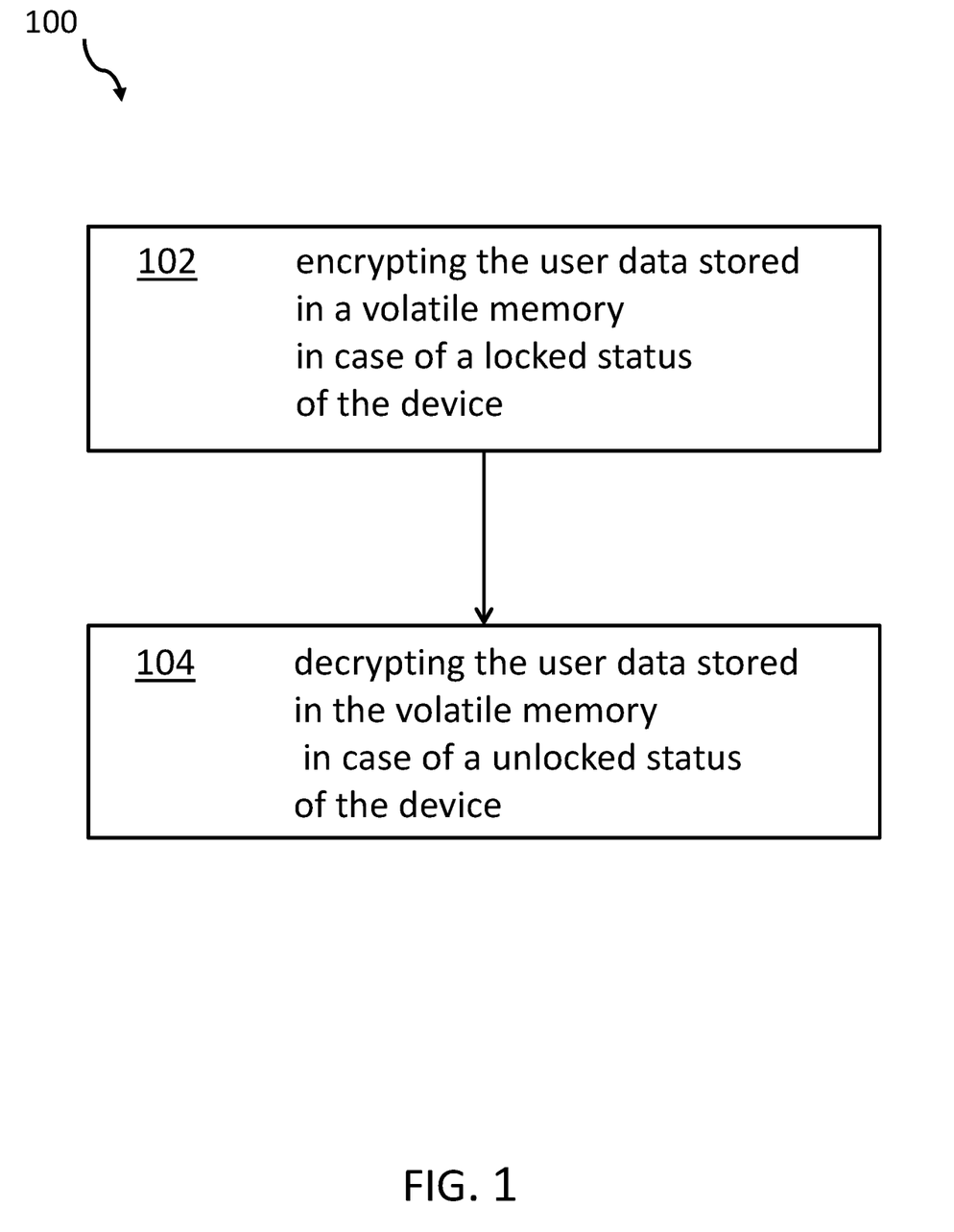
FIG. 1 shows a block diagram of an embodiment of the inventive computer-implemented method for protecting a mobile device against unauthorized access.

FIG. 1 shows a block diagram of an embodiment of the computer-implemented method 100 for protecting a mobile device—like a mobile phone a mobile and/or smart key, a mobile payment device, an MP3 player, etc., against unauthorized access of user data—in particular user application data—stored in the mobile device. The method comprises encrypting, 102, the user data stored in a volatile memory—i.e., in the RAM—not necessarily operating system data—of the mobile device if the mobile device is switched—e.g., automatically after an inactive period or activated by the user, in particular, directly after power on before unlocking the screen—to a locked status, and decrypting, 104, the user data stored in the volatile memory if the mobile device is switched from the locked status into an unlocked status.

Figure 2:
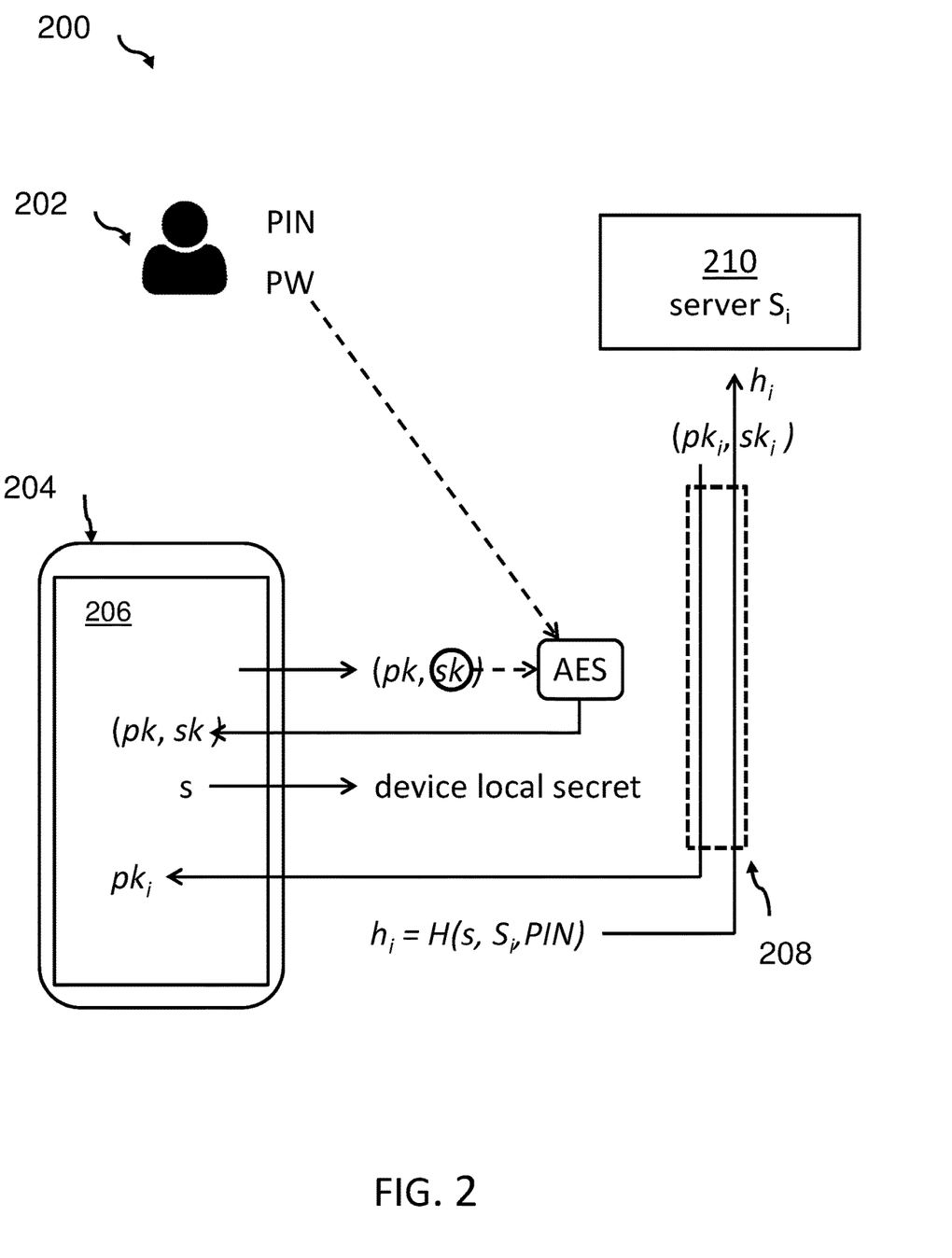
FIG. 2 shows a block diagram of an embodiment of a setup phase.

FIG. 2 shows a block diagram 200 of an embodiment of a setup phase. The user 202 registers a short—or low-entropy—PIN for a normal operation of the device in cooperation with at least one remote server and a long—or high-entropy—password PW. As encryption method, AES (Advances Encryption Standard) is shown exemplarily using a public $p_k$, private (secure) key $s_k$) in the mobile device 204 having a screen (206). Also shown is the device's local secret s. A secure connection 208 is used to wirelessly communicate with the at least one server $S_i$ 210. After the setup phase, each of the servers $S_i$ store a portion of the key required for decrypting the user content of the RAM after the mobile device is reset to an unlocked status.

Figure 3:
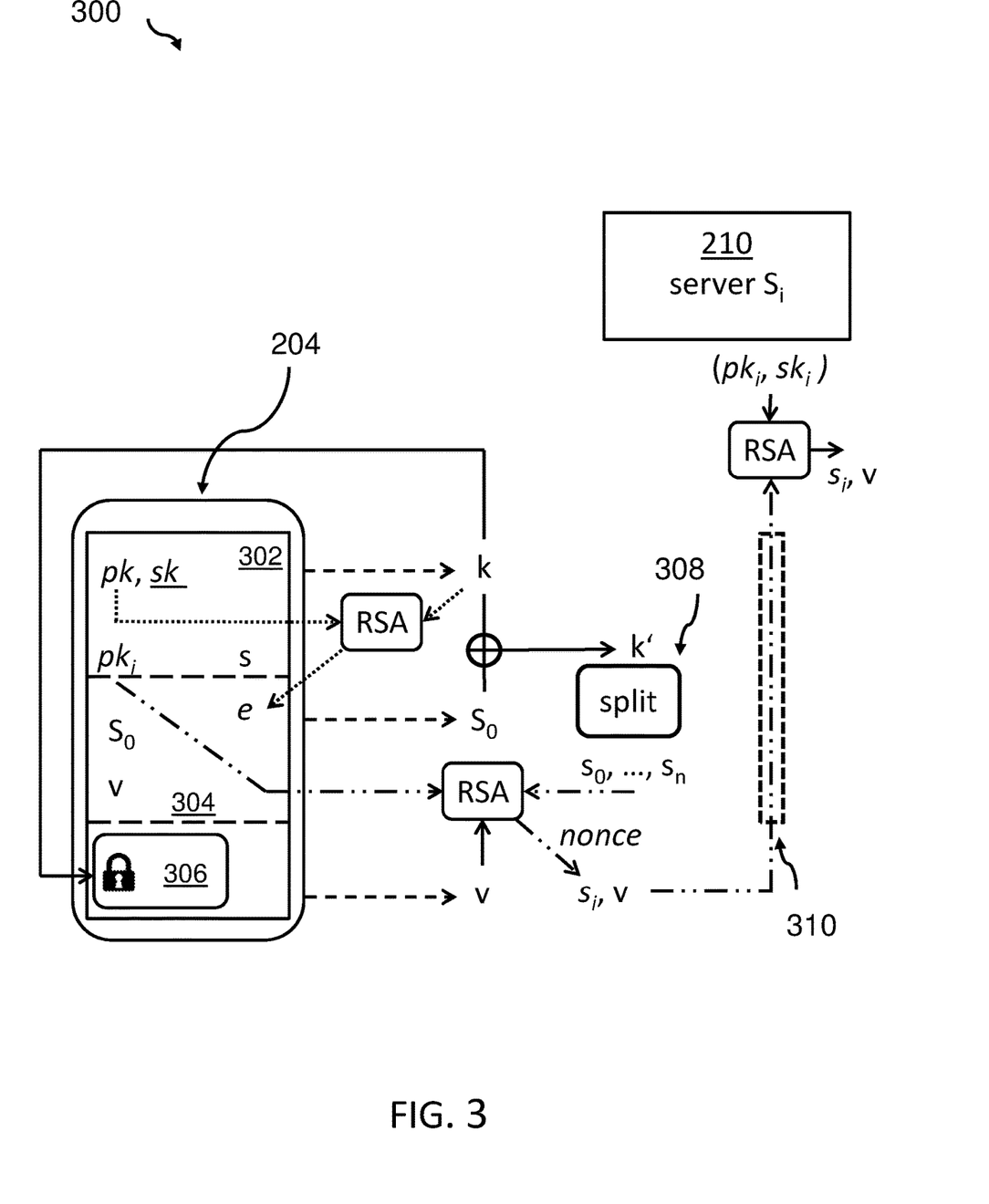
FIG. 3 shows a block diagram of an embodiment of the encryption phase.

FIG. 3 shows a block diagram 300 of an embodiment of the encryption phase of the user RAM content in case the mobile device is set into a locked status. As an example, the RSA (Rivest-Shamir-Adleman) algorithm is shown for an encryption of the temporary—or fresh—encryption key k. Together with the temporary blinding key the key k' is split 308 into a plurality of partial shares (each portion for one of the plurality of servers $S_i$). The public key $pk_i$ relating to the server $S_i$ is used to RSA-encrypt the partial shares for a transmission over an unsecured wireless connection 310 to the server $S_i$. It may be noted that in case there is only one server $S_i$ the step of splitting 308 may be omitted.

On the server side, the RSA method may be used to decrypt the RSA-encrypted partial share sent to the server, so that it can be sent back again to the user at a later point during the unlock phase.

It may also be noted that the volatile memory/non-volatile storage of the mobile device is symbolically split in three separate portions: a non-volatile storage 302 for storing static keys pk and sk; a kernel mode RAM portion 304 and a user RAM space portion 306 which becomes CTR mode locked.

Figure 4:
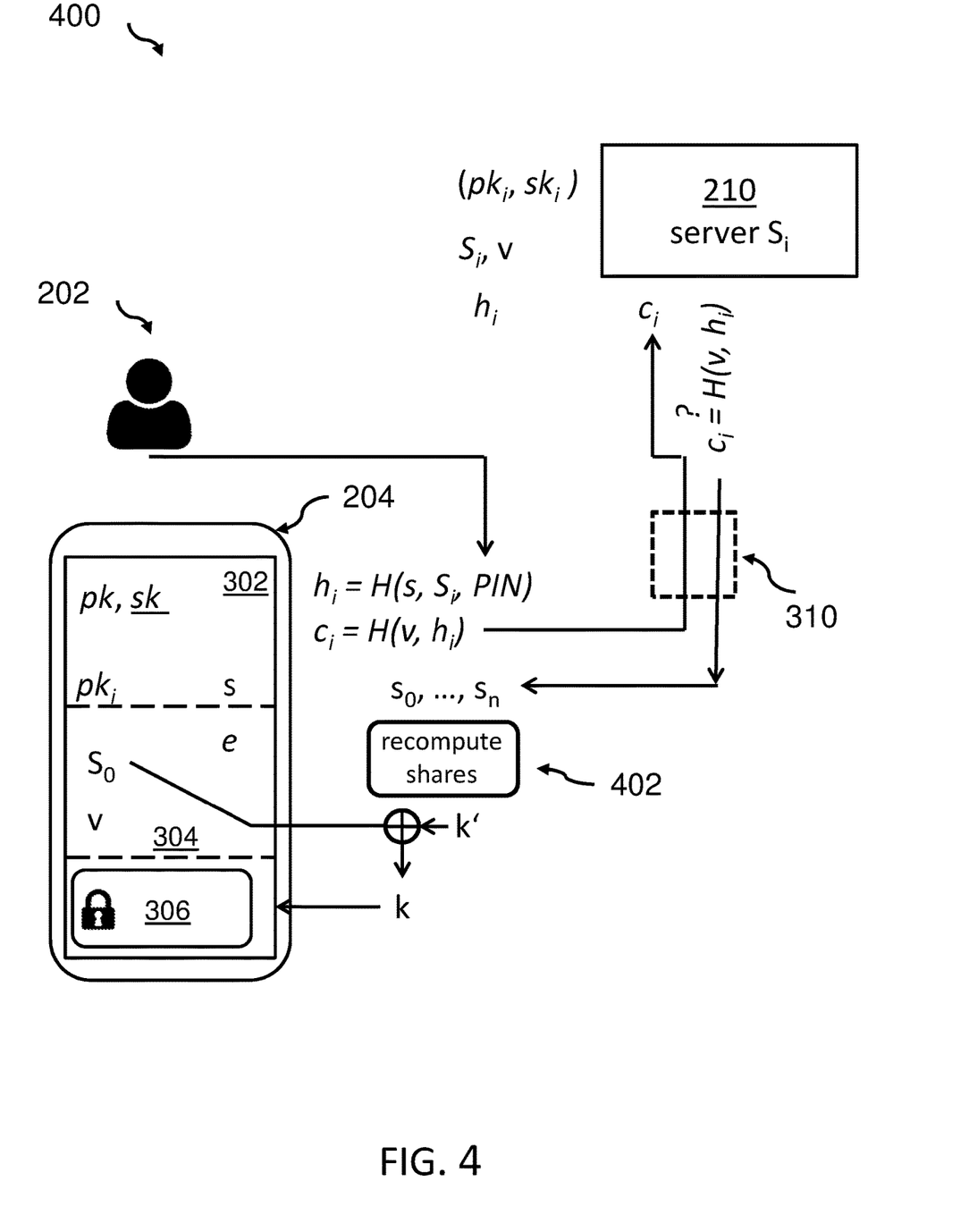
FIG. 4 shows a block diagram of an embodiment of the decryption phase.

FIG. 4 shows a block diagram 400 of an embodiment of the normal decryption phase using a PIN from a user 202. The norm and decryption phase is characterized by a corporation between the mobile device and the remote server(s) for enabling a decryption of the user data in the RAM. The user 202 enters his low-entropy PIN to receive back the key portions stored on the one or more servers $S_i$ over the unsecure wireless connection 310. After a re-computing 402 of the portions or shares $s_0, \ldots s_n$ from the server(s) $S_i$ a key k' can be derived and together with a public key $pk_i$ the key k for a decryption of the user data in the memory portion 306 of the RAM. Hence, in order to decrypt the user data in the RAM, the server $S_i$ is required to send back a positive result of the challenge $c_i$.

Figure 5:
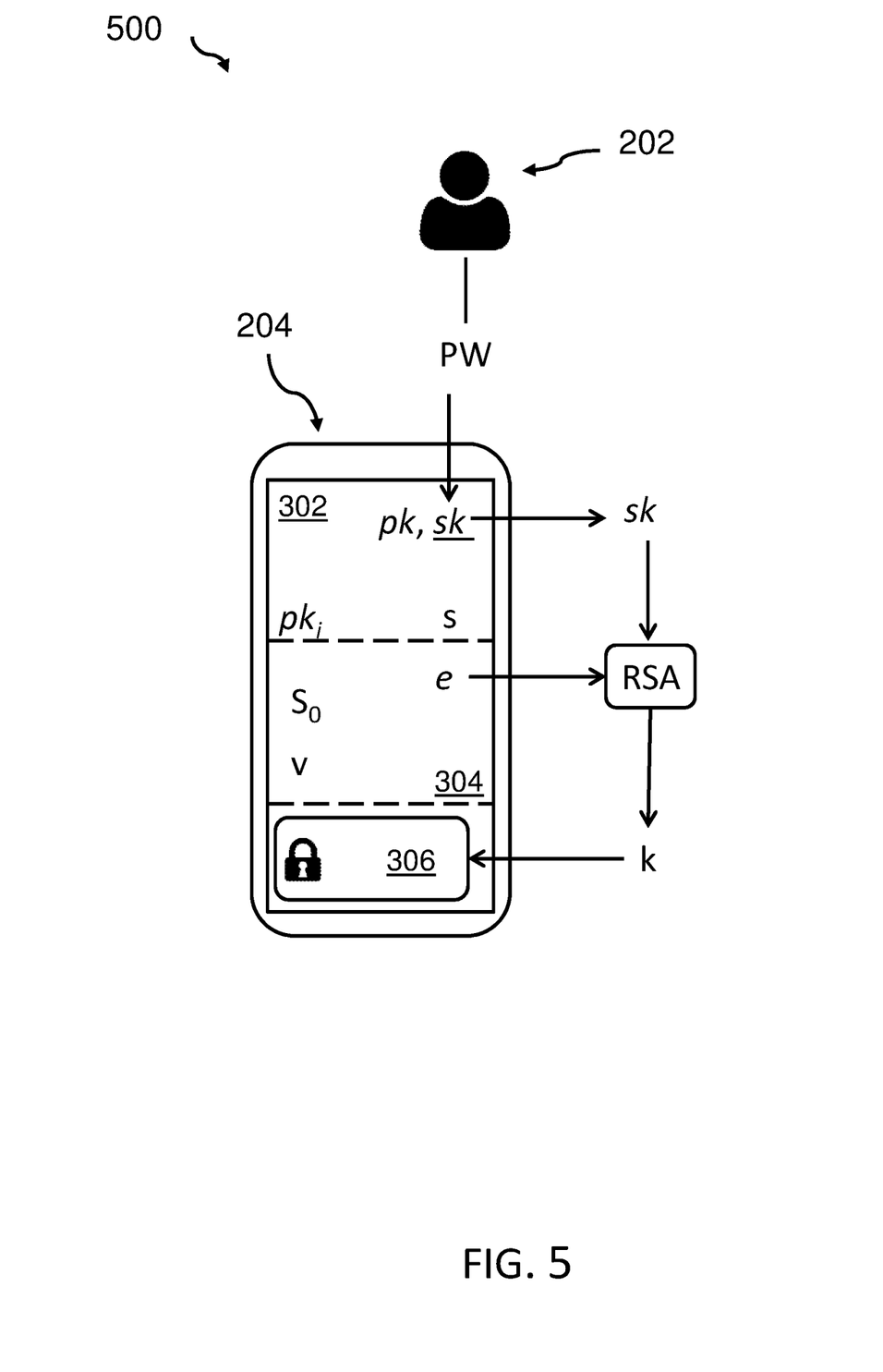
FIG. 5 shows a block diagram of an embodiment of the decryption phase in an alternative mode.

FIG. 5 shows a block diagram 500 of an embodiment of the decryption phase in an alternative mode. Here, it is assumed, that no connection to any of the servers $S_i$ is available. In this case, the user 202 enters his long—i.e., high-entropy key—password PW in two of the input devices (e.g., a touch-sensitive screen) of the mobile device 204 from which the key k is reconstructed in order to decrypt the user data in the memory portion 306 of the RAM. In this case, the variables $pk_i$, $S_0$ and v are not required. It may be noted that the long password PW may, e.g., be a long sentence easily being remembered by the user 202. However, it may be too time-consuming and inadequate to type in the long PW each time, the mobile device should be set into the unlocked status again. For this, the short PIN is much more competent, but requires the communication with the remote server(s).

Figure 6:
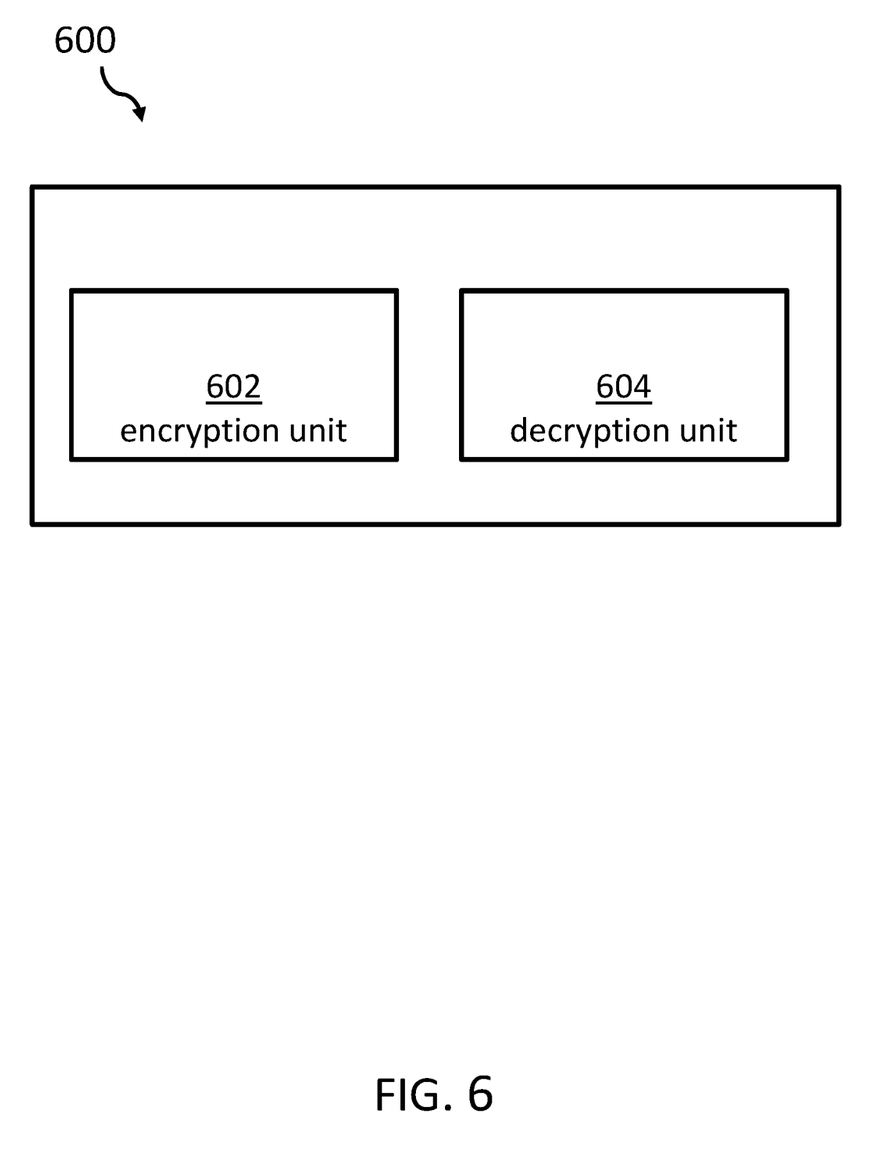
FIG. 6 shows a block diagram of a system for protecting a mobile device against unauthorized access.

FIG. 6 shows a higher-level block diagram of the user data protection system 600 for protecting a mobile device against unauthorized access of user data stored in the mobile device. Such a system comprises—shown in a more abstract way if compared to the above explained, detailed functions—an encryption unit 602 adapted for encrypting the user data stored in a volatile memory of the mobile device if the mobile device is switched to a locked status, and a decryption unit 604 adapted for decrypting the user data stored in the volatile memory if the mobile device is switched from the locked status into an unlocked status.

Figure 7:
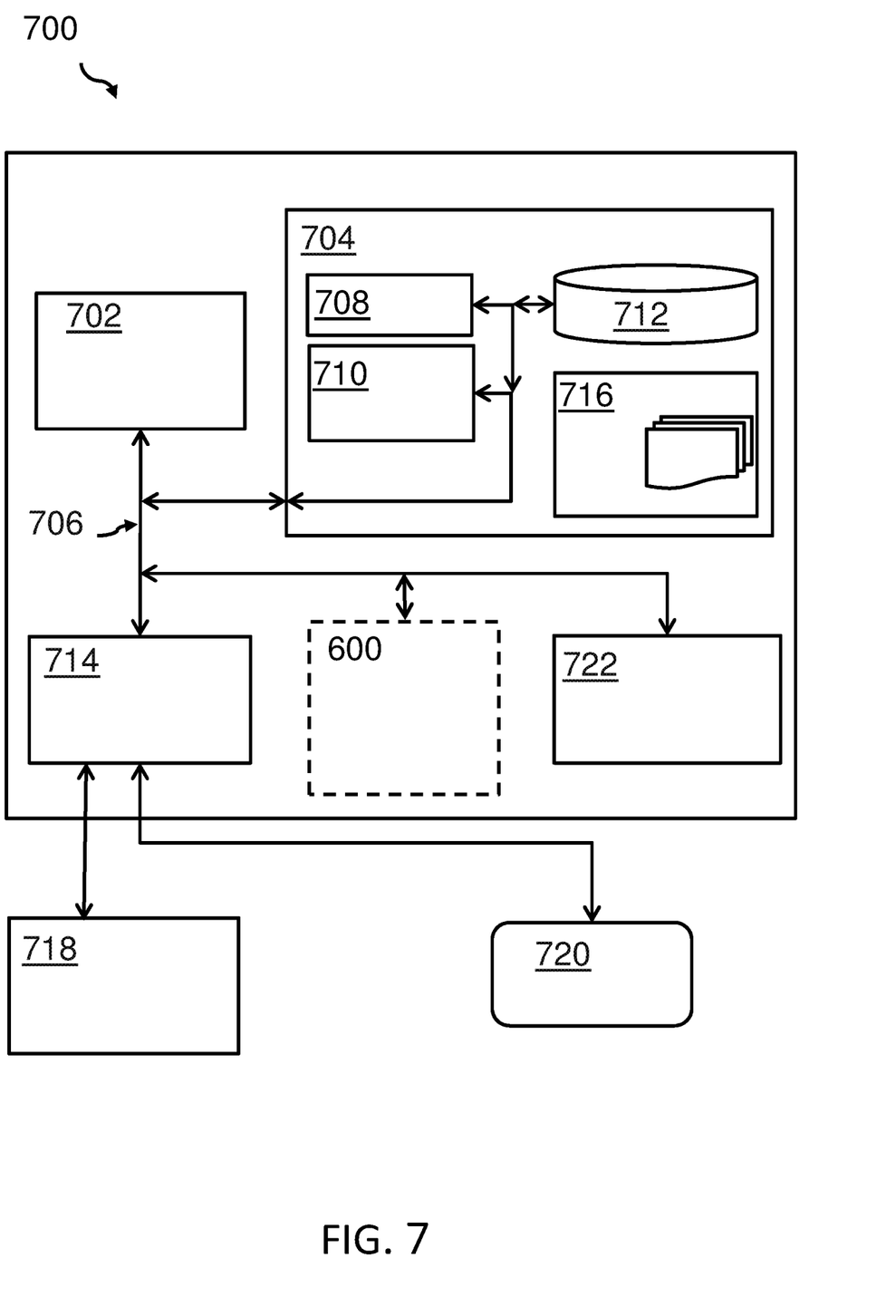
FIG. 7 shows an embodiment of a computing system comprising the system according to FIG. 6.

Embodiments of the invention may be implemented together with virtually any type of computer, regardless of the platform being suitable for storing and/or executing program code. FIG. 7 shows, as an example, a computing system 700 suitable for executing program code related to the proposed method.

The computing system 700 is only one example of a suitable computer system, and is not intended to suggest any limitation as to the scope of use or functionality of embodiments of the invention described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, system 600 for protecting a mobile device against unauthorized access may be attached to the bus system 706 or may in another way be a portion of the computing system implemented as a mobile device.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for protecting a mobile device against unauthorized access to user data stored in the mobile device, the computer-implemented method comprising:
    encrypting the user data stored in a volatile memory of the mobile device responsive to the mobile device being switched to a locked status;
    decrypting said user data stored in said volatile memory of the mobile device responsive to said mobile device being switched from said locked status into an unlocked status;
    protecting a fresh encryption key used in encrypting the user data stored in the volatile memory of the mobile device, by encoding said fresh encryption key into two parts, namely a local recovery key, stored in a non-volatile memory of said mobile device, and a remote recovery key, sent to a remote server;
    deleting said remote recovery key and said fresh encryption key from said mobile device, wherein the local recovery key being accessible without any external system to said mobile device and wherein a combination of the local recovery key and the remote recovery key together form a complete recovery key to decrypt and reassess the encrypted user data stored in the volatile memory of the mobile device, and wherein the fresh encryption key is a one-time encryption key newly generated for encrypting the user data stored in the volatile memory of the mobile device; and
    generating a message authentication code (MAC) associated with the remote recovery key sent to the remote server, and responsive to receiving the remote recovery key returned from the remote server for decrypting, checking whether the MAC is correct, and responsive to determining that the MAC is correct, accepting the remote recovery key returned from the remote server for the decrypting.

2. The method according to claim 1, also comprising switching said mobile device into said locked status after a power-on of said mobile device, or after a time period of inactivity, or after receiving a lock signal.

3. The method according to claim 1, also comprising using the fresh encryption key every time said encrypting said user data stored in said volatile memory is performed.

4. The method according to claim 3, also comprising protecting said fresh encryption key by encrypting said fresh encryption key by a static encryption key, wherein said static encryption key is a public key of a public/private key pair.

5. The method according to claim 4, also comprising encrypting a private key of said public/private key pair using a high-entropy key derived by a high-entropy user input, and
    storing resulting encrypted private key of said public/private key pair on a non-volatile memory of said mobile device.

6. The method according to claim 1, wherein said switching said mobile device from a locked status into said unlocked status comprises
    receiving a personal identification number, and
    using said personal identification number for performing an authentication protocol with a remote server.

7. The method according to claim 6, wherein a success of an authentication protocol with said remote server comprises
    receiving a remote recovery key from said remote server, and using said remote recovery key and a local recovery key to recover a fresh encryption key.

8. The method according to claim 1, further including performing an authentication protocol with said remote server, wherein a failure on the authentication protocol with the remote server comprises
    prompting for inserting a high-entropy user input,
    using said high-entropy user input to recover a high-entropy key,
    using said high-entropy key to decrypt said private key of said public/private key pair, and
    using said private key of said public/private key pair to decrypt said fresh encryption key which was encrypted using said static encryption key.

9. The method according to claim 1, wherein said mobile device comprises a display and wherein said switching said mobile device into a locked status comprises blocking keypad inputs apart from accepting a personal identification number or, if no network connection is available, accepting a high-entropy value.

10. A user data protection system for protecting a mobile device against unauthorized access to user data stored in said mobile device, said user data protection system comprising:
    a processor, an encryption unit adapted for encrypting said user data stored in a volatile memory of the mobile device responsive to the mobile device being switched to a locked status, and
    a decryption unit adapted for decrypting the user data stored in the volatile memory of the mobile device responsive to said mobile device being switched from said locked status into an unlocked status, the processor configured for:
    protecting a fresh encryption key used in encrypting the user data stored in the volatile memory of the mobile device, by encoding said fresh encryption key into two parts, namely a local recovery key, stored in a non-volatile memory of said mobile device, and a remote recovery key, sent to a remote server;

deleting said remote recovery key and said fresh encryption key from said mobile device, wherein the local recovery key being accessible without any external system to said mobile device and wherein a combination of the local recovery key and the remote recovery key together form a complete recovery key to decrypt and reassess the encrypted user data stored in the volatile memory of the mobile device, and wherein the fresh encryption key is a one-time encryption key newly generated for encrypting the user data stored in the volatile memory of the mobile device; and generating a message authentication code (MAC) associated with the remote recovery key sent to the remote server, and responsive to receiving the remote recovery key returned from the remote server for decrypting, checking whether the MAC is correct, and responsive to determining that the MAC is correct, accepting the remote recovery key returned from the remote server for the decrypting.

11. The user data protection system according to claim 10, also comprising
a process configured for switching said mobile device into said locked status after a power-on of said mobile device, or after a time period of inactivity, or after receiving a lock signal.

12. The user data protection system according to claim 10, wherein said encryption unit is also adapted for
using the fresh encryption key every time said encrypting said user data stored in a volatile memory is performed.

13. The user data protection system according to claim 12, wherein the processor is further adapted for protecting said fresh encryption key by encrypting said fresh encryption key by a static encryption key, wherein said static encryption key is a public key of a public/private key pair.

14. The user data protection system according to claim 13, wherein said encryption unit is also adapted for
encrypting said private key of said public/private key pair using a high-entropy key derived by a high-entropy user input, and
storing resulting encrypted private key of said public/private key pair on a non-volatile memory of said mobile device.

15. The user data protection system according to claim 10, wherein said switching said mobile device from a locked status into said unlocked status also comprises
receiving a personal identification number, and
using said personal identification number for performing an authentication protocol with a remote server.

16. The user data protection system according to claim 15, wherein a success of an authentication protocol with a remote server comprises
receiving said remote recovery key from said remote server, and using said remote recovery key and a local recovery key to recover a fresh encryption key.

17. The user data protection system according to claim 10, the user data protection system performing an authentication protocol with said remote server, wherein a failure on the authentication protocol with the remote server comprises
prompting for inserting a high-entropy user input,
using said high-entropy user input to recover a high-entropy key,
using said high-entropy key to decrypt said private key of said public/private key pair, and
using said private key of said public/private key pair to decrypt said fresh encryption key which was encrypted using said static encryption key.

18. A computer program product for protecting a mobile device against unauthorized access to user data stored in said mobile device, said computer program product comprising a computer readable storage medium having program instructions embodied therewith, said program instructions responsive to being executed by one or more computing systems or controllers to cause said one or more computing systems or said controllers to:
encrypt said user data stored in a volatile memory of said mobile device responsive to said mobile device being switched to a locked status;
decrypt said user data stored in said volatile memory of the mobile device responsive to said mobile device being switched from said locked status into an unlocked status;
protect a fresh encryption key used in encrypting the user data stored in the volatile memory of the mobile device, by encoding said fresh encryption key into two parts, namely a local recovery key, stored in a non-volatile memory of said mobile device, and a remote recovery key, sent to a remote server;
delete said remote recovery key and said fresh encryption key from said mobile device, wherein the local recovery key being accessible without any external system to said mobile device and wherein a combination of the local recovery key and the remote recovery key together form a complete recovery key to decrypt and reassess the encrypted user data stored in the volatile memory of the mobile device, and wherein the fresh encryption key is a one-time encryption key newly generated for encrypting the user data stored in the volatile memory of the mobile device; and
generate a message authentication code (MAC) associated with the remote recovery key sent to the remote server, and responsive to receiving the remote recovery key returned from the remote server for decrypting, check whether the MAC is correct, and responsive to determining that the MAC is correct, accept the remote recovery key returned from the remote server for the decrypting.

* * * * *